(12) United States Patent
Im et al.

(10) Patent No.: US 11,916,261 B2
(45) Date of Patent: Feb. 27, 2024

(54) THERMAL BATTERY SYSTEM AND IGNITION METHOD OF THE SAME

(71) Applicant: AGENCY FOR DEFENSE DEVELOPMENT, Daejeon (KR)

(72) Inventors: Chaenam Im, Daejeon (KR); Jae In Lee, Daejeon (KR); Hyunki Yoon, Daejeon (KR); Yusong Choi, Daejeon (KR); Jang Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/547,206

(22) Filed: Dec. 9, 2021

(65) Prior Publication Data
US 2022/0190358 A1 Jun. 16, 2022

(30) Foreign Application Priority Data
Dec. 10, 2020 (KR) .................. 10-2020-0172567

(51) Int. Cl.
*H01M 6/36* (2006.01)
*H01M 50/509* (2021.01)
*H01M 6/50* (2006.01)

(52) U.S. Cl.
CPC ........... *H01M 6/36* (2013.01); *H01M 6/5038* (2013.01); *H01M 6/5088* (2013.01); *H01M 50/509* (2021.01)

(58) Field of Classification Search
CPC .... H01M 6/36; H01M 6/5038; H01M 6/5088; H01M 6/32; H01M 6/34; H01M 6/30; H01M 6/38; H01M 6/385; H01M 50/509
See application file for complete search history.

(56) References Cited

U.S. PATENT DOCUMENTS 4,585,713 A 4/1986 Pathëet al.
6,818,344 B2 * 11/2004 Daoud .................. H01M 6/36
429/57
(Continued)

FOREIGN PATENT DOCUMENTS

JP 7-56806 6/1995
JP 2019-176624 10/2019
(Continued)

OTHER PUBLICATIONS

Office Action in the Korean Application No. 10-2020-0172567, dated Jan. 25, 2021.
(Continued)

*Primary Examiner* — Matthew T Martin
*Assistant Examiner* — Bartholomew A Hornsby
(74) *Attorney, Agent, or Firm* — Ladas & Parry, LLP

(57) ABSTRACT

Provided are a thermal battery system and an ignition method of the same, wherein the thermal battery system includes: a thermal battery assembly including a plurality of thermal batteries arranged in series and in parallel; an ignition circuit connected to the plurality of thermal batteries in the thermal battery assembly; and a control unit configured to control the ignition circuit such that each of the plurality of thermal batteries in the thermal battery assembly is selectively ignited, wherein the control unit is configured to selectively ignite one of the plurality of thermal batteries in an active matrix manner by controlling an ignition circuit.

9 Claims, 7 Drawing Sheets

(56) References Cited

U.S. PATENT DOCUMENTS

| | | | | |
|---|---|---|---|---|
| 2005/0253458 A1* | 11/2005 | Omae | ................. | H02J 1/10 |
| | | | | 307/10.1 |
| 2015/0137767 A1 | 5/2015 | Kim | | |
| 2019/0305385 A1* | 10/2019 | Tsuchiya | ............. | H01M 50/269 |
| 2019/0393717 A1* | 12/2019 | Rastegar | ............... | H02J 7/0063 |
| 2020/0119369 A1* | 4/2020 | Westphal | .............. | H02J 7/1423 |

FOREIGN PATENT DOCUMENTS

| KR | 10-1995-0024365 | 8/1995 |
|---|---|---|
| KR | 10-2015-0057732 | 5/2015 |
| KR | 10-1975439 | 5/2019 |
| KR | 10-2140803 | 8/2020 |

OTHER PUBLICATIONS

Notice of Allowance in the Korean Application No. 10-2020-0172567, dated Mar. 29, 2021.

* cited by examiner

THERMAL BATTERY SYSTEM AND IGNITION METHOD OF THE SAME

CROSS-REFERENCE TO RELATED APPLICATION

This application is based on and claims priority under 35 U.S.C. § 119 to Korean Patent Application No. 10-2020-0172567, filed on Dec. 10, 2020, in the Korean Intellectual Property Office, the disclosure of which is incorporated by reference herein in its entirety.

BACKGROUND

1. Field

One or more embodiments relate to a thermal battery system and an ignition method of the same, and more particularly, to a thermal battery system for individually igniting thermal batteries configuring the thermal battery system, and an ignition method of the thermal battery system.

2. Description of the Related Art

A thermal battery is a reserve primary battery that maintains an inert state at a room temperature, ignites a heat source by an ignition device flame when operated, and is activated when a sold electrolyte is melded within few seconds. The thermal battery mainly uses $Fe/KClO_4$ as the heat source, an Li—Si alloy as a negative electrode, $FeS_2$ (pyrite) as a positive electrode, and eutectic salts of LiF—LiCl—LiBr as a component of the solid electrolyte.

An activation time during which the solid electrolyte is melted by ignition of the heat source according to the ignition device flame is one of important factors during initial activation of the thermal battery. A main factor of the activation time may be the ignition of the heat source by the ignition device flame.

An ignition device is manufactured by using two types of explosives, i.e., a main agent and an initiator, and performs a function as the ignition device when the initiator explodes by an external electric signal (5 A/10 msec) and the main agent is combusted by the initiator.

At least one ignition device may be installed inside the thermal battery, but one thermal battery includes one ignition device except for a particular case. A method of activating the thermal battery may be very simple when power is able to be supplied to the ignition device installed inside the thermal battery, by using a power supply.

Korean Patent No. 10-2140803 (Jul. 28, 2020) relates to an apparatus and method for testing performance of an ignition device for a thermal battery, and provides the apparatus for testing the performance of the ignition device for the thermal battery, the apparatus including: a lower case forming an accommodation space; an upper case combined to the lower case to seal the accommodation space; a thermal battery simulation assembly arranged in the accommodation space and in which at least one thermal battery simulation unit is stacked; and an ignition device arranged at the upper case and ejecting a flame into the accommodation space, wherein the thermal battery simulation unit is formed as a first current collector, a heat source arranged on one surface of the first current collector and ignited by the ignition device, a second current collector arranged on one surface of the heat source, and mica arranged on one surface of the second current collector are stacked.

To supply external electric (power) signal to the ignition device installed inside the thermal battery as above, a positive electrode terminal, a negative electrode terminal, and a wire connecting a power supply to each terminal is required. Also, an activation on/off switch for external electric signal control and noise prevention may be provided at each wire. When such a configuration is applied to a thermal battery system including a plurality of thermal batteries, too many activation switches and complicated wiring are required.

For example, when the number of thermal batteries included in the thermal battery system is 7, the numbers of wires and switches electrically connected to each of the positive electrode terminal and negative electrode terminal of the ignition device are respectively 14. When the number of thermal batteries included in the thermal battery system increases, the numbers of wires and switches increase in multiples of the number of thermal batteries, thereby complicating a configuration of the thermal battery system. Also, ignition device wires are unable to be used by being connected in series, and even when the ignition device wires are connected in parallel, activation switches corresponding to the thermal batteries respectively need to be all included due to a safety issue. Thus, not only the thermal battery system becomes largely complicated, but also a space, weight, and costs of the thermal battery system are increased due to wires, activation switches, and the like.

PRIOR ART DOCUMENTS

Patent Documents (Patent document 1) 1. Korean Patent no. 10-2140803 (2020.07.28)

SUMMARY

One or more embodiments include a thermal battery system including an ignition matrix device for individually igniting thermal batteries configuring the thermal battery system.

One or more embodiments include an ignition method of the thermal battery system.

Additional aspects will be set forth in part in the description which follows and, in part, will be apparent from the description, or may be learned by practice of the presented embodiments of the disclosure.

According to one or more embodiments, a thermal battery system includes: a thermal battery assembly including a plurality of thermal batteries arranged in series and in parallel; an ignition circuit connected to the plurality of thermal batteries in the thermal battery assembly; and a control unit configured to control the ignition circuit such that each of the plurality of thermal batteries in the thermal battery assembly is selectively ignited, wherein the ignition circuit includes: a first terminal configured such that a first ignition voltage is applied; a second terminal configured such that a second ignition voltage is applied; a plurality of first wires connecting first ignition electrodes of thermal batteries arranged in series from among the plurality of thermal batteries; a plurality of second wires connecting second ignition electrodes of thermal batteries arranged in parallel from among the plurality of thermal batteries; a plurality of first switches connecting the plurality of first wires and the first terminal, according to control by the control unit; and a plurality of second switches connecting the plurality of second wires and the second terminal, according to control by the control unit.

The thermal battery assembly may include a plurality of thermal battery modules connected in series, each of the plurality of thermal battery modules may include a plurality of thermal batteries connected in parallel, the thermal batteries arranged in parallel may be arranged at the plurality of thermal battery modules, respectively, and the thermal batteries arranged in series may be arranged at corresponding locations in the plurality of thermal battery modules.

When the thermal battery assembly may include M thermal battery modules, and each of the M thermal battery modules may include N thermal batteries, a number of the plurality of first switches may be N, and a number of the plurality of second switches may be M.

The control unit may be configured to selectively ignite one of the plurality of thermal batteries in an active matrix manner, by using the plurality of first switches and the plurality of second switches.

The control unit may be configured to select one of the plurality of thermal batteries by turning on one of the plurality of first switches and one of the plurality of second switches, and individually ignite the selected thermal battery.

The control unit may be configured to sequentially ignite the plurality of thermal batteries at pre-set time intervals, and the pre-set time intervals may be 10 ms.

According to one or more embodiments, an ignition method of the thermal battery system, includes: selecting, by the control unit, one of a plurality of first wires connecting first ignition electrodes of thermal batteries arranged in series from among the plurality of thermal batteries, and turning on a first switch for connecting the selected first wire to a first terminal; selecting, by the control unit, one of a plurality of second wires connecting second ignition electrodes of thermal batteries arranged in parallel from among the plurality of thermal batteries, and turning on a second switch for connecting the selected second wire to a second terminal; igniting, by the control unit, a thermal battery in which a first electrode is connected to the selected first wire and a second electrode is connected to the selected second wire; and repeating, by the control unit, the turning on of the first switch, the turning on of the second switch, and the igniting of the thermal battery.

The repeating may include sequentially igniting, by the control unit, the plurality of thermal batteries at pre-set time intervals, wherein the pre-set time intervals may be 10 ms.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
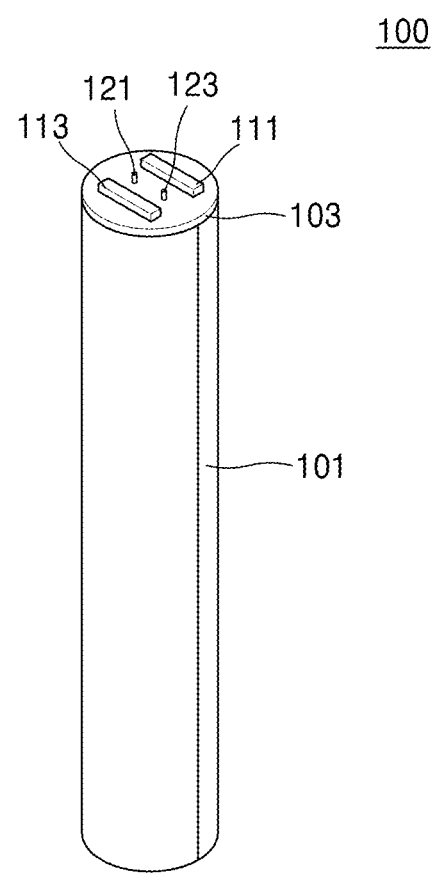
FIG. 1 is a perspective view of a thermal battery configuring a thermal battery system, according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

While the disclosure allows various modifications and changes, particular embodiments are illustrated in the drawings, and will be described in detail below. However, the disclosure is not intended to be limited to a particular form of the disclosure, and rather, the disclosure includes all modifications, equivalents, and substitutions that conformed to the spirit of the disclosure defined by the claims.

When an element, such as a layer, a region, or a substrate, is referred to as being present "on" another element, the element may be present directly on the other element or an intervening element may be present therebetween.

Although the terms, such as first, second, and the like, may be used to describe various elements, components, areas, layers, and/or regions, these elements, components, areas, layers, and/or regions should not be limited by such terms.

Hereinafter, embodiments of the disclosure will be described in more detail with reference to the accompanying drawings. In the drawings, same reference numerals are used for same elements, and redundant descriptions regarding the same elements will be omitted.

FIG. 1 is a perspective view of a thermal battery 100 configuring a thermal battery system, according to an embodiment of the disclosure.

Referring to FIG. 1, the thermal battery 100 includes a thermal battery case 101 and a thermal battery head 103.

The thermal battery case 101 protects, from an external environment, and accommodates an ignition device and a stack assembly configuring the thermal battery 100. The thermal battery case 101 may accommodate a plurality of stack assemblies in series or in parallel, according to capacity required by the thermal battery 100.

Here, the stack assembly of the thermal battery 100 includes a unit cell, a heat source, a first current collector, and a second current collector. The unit cell includes a positive electrode, an electrolyte, and a negative electrode, and the positive electrode may include at least one of iron sulfide ($FeS_2$), cobalt sulfide ($CoS_2$), and nickel sulfide ($NiS_2$). The electrolyte is eutectic salts melted at a high temperature, and may include at least one of LiCl—KCl, LiCl—LiF, LiF—LiCl-L:iBr, LiF—CaF2, LiF—KF, and LiF—NaF eutectic salts. The negative electrode may include at least one of lithium-silicon (Li—Si), lithium-aluminum (Li—Al), lithium-iron (Li—Fe), and lithium-boron (Li—B).

The first current collector and the second current collector include stainless steel or nickel. The first current collector receive charges from the positive electrode and the second current collector receive charges from the negative electrode.

The thermal battery case 101 may include an insulator for protecting an external wire and apparatus from heat generated when the thermal battery 100 is activated, and may have any one of various shapes, such as a cylindrical shape, a hexagonal column shape, and a rectangular column shape, depending on a purpose and necessity of the thermal battery system.

The thermal battery head 103 includes a first electrode 111, a second electrode 113, a first ignition electrode 121, and a second ignition electrode 123, for connecting the stack assembly and ignition device inside the thermal battery 100 to an external circuit.

The first electrode 111 accesses the external circuit of the thermal battery 100 by being electrically connected to the first current collector, and the second electrode 113 accesses the external circuit of the thermal battery 100 by being electrically connected to the second current collector. In other words, the first electrode 111 and the second electrode 113 supply, to the external circuit, electric energy generated when the thermal battery 100 is activated.

The first ignition electrode 121 and the second ignition electrode 123 are electrically connected to a positive electrode and a negative electrode of the ignition device, respectively. The first ignition electrode 121 and the second ignition electrode 123 applies an ignition signal to the ignition device by electrically accessing the external circuit. Upon receiving the ignition signal, the ignition device ignites the heat source, and the thermal battery 100 is activated when a solid electrolyte configuring the stack assembly of the thermal battery 100 melts due to heat generated when the heat source is ignited.

Figure 2:
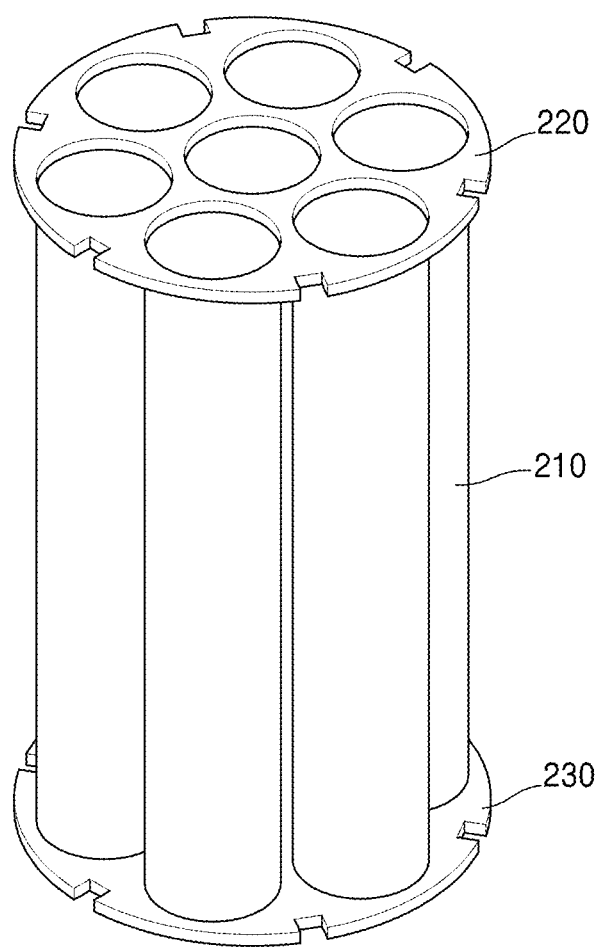
FIG. 2 is a perspective view of a thermal battery module configuring a thermal battery system, according to an embodiment of the disclosure.

FIG. 2 is a perspective view of a thermal battery module 200 configuring a thermal battery system, according to an embodiment of the disclosure.

Referring to FIG. 2, the thermal battery module 200 includes a plurality of thermal batteries 210, and a first fixing portion 220 and second fixing portion 230 for fixing the plurality of thermal batteries 210.

The plurality of thermal batteries 210 are arranged such that thermal battery heads face a same direction. The plurality of thermal batteries 210 may be stably arranged in adjacent to each other. For example, one thermal battery 210 may be arranged at the center and the plurality of thermal batteries 210 may be arranged adjacent to each other along a circumference of a circle centering around the center.

The first fixing portion 220 may include a wire or busbar for connecting the plurality of thermal batteries 210 in parallel, and connectors for supplying, to an external circuit, electric energy generated by the plurality of thermal batteries 210 and receiving an activation signal from the external circuit.

The second fixing portion 230 may include fixing devices for stably fixing the plurality of thermal batteries 210. Also, the second fixing portion 230 may further include a wire and combining device for combining with the first fixing portion 220, so as to form a thermal battery assembly by stacking the thermal battery modules 200 in a direction parallel to a thermal battery axis.

Figure 3:
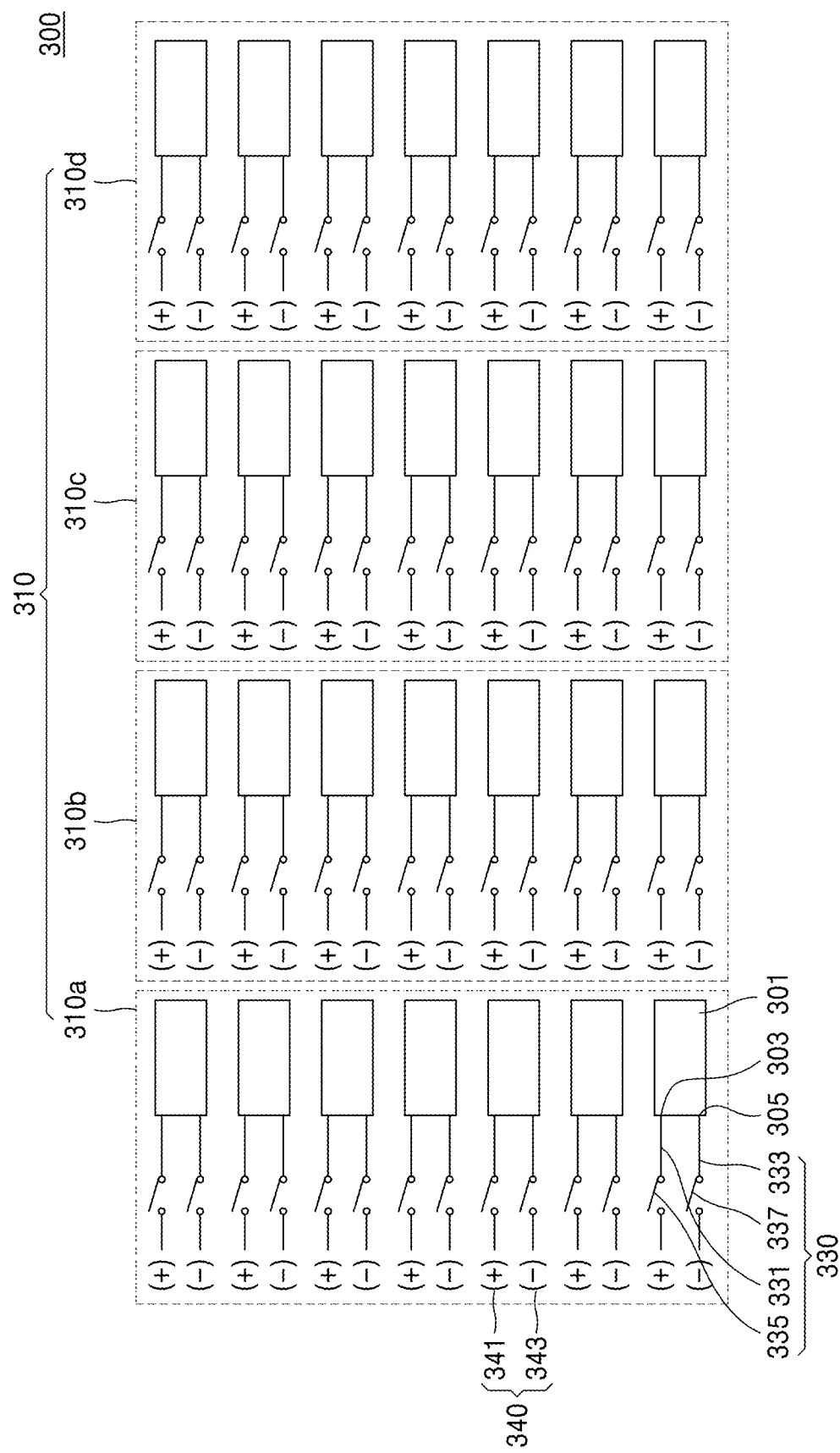
FIG. 3 is a diagram of an existing ignition circuit for selectively activating each thermal battery configuring a thermal battery assembly.

FIG. 3 is a diagram of an existing ignition circuit 330 for selectively activating each thermal battery configuring a thermal battery assembly 320.

Referring to FIG. 3, a thermal battery system 300 includes the thermal battery assembly 320 and the ignition circuit 330. A plurality of thermal batteries 301 form one thermal battery module 310, and a plurality of thermal battery modules 310 are stacked in a direction parallel to an axis of the terminal battery 301 to configure the thermal battery assembly 320.

Here, to selectively active each of the thermal batteries 301, a first wire 331 connected to a first ignition electrode 303 of the thermal battery 301, a second wire 333 connected to a second ignition electrode 305, a first switch 335 for turning on or off an electric connection of the first wire 331, a second switch 337 for turning on or off an electric connection of the second wire 333, a first terminal 341 for connecting the first wire 331 and an external circuit, and a second terminal 343 for connecting the second wire 333 and the external circuit.

According to an existing ignition device described above, one thermal battery module 310 including seven thermal batteries 301 requires 14 wires and switches, and when four thermal battery modules 310 are stacked to form the thermal battery assembly 320, 56 wires and switches are required. The ignition circuit 330 and an ignition terminal 340 not only increases volume and weight of a thermal battery system, but also increases costs of the thermal battery system due to manufacture and installation costs. Also, a temperature inside the activated thermal batteries 301 reaches up to 500° C. Because a considerable amount of heat is externally discharged through heat transfer during an operation of the thermal battery 301 or when the operation is completed, even when the thermal battery case 101 includes the insulator to block heat generated when the thermal battery 301 is activated, the ignition circuit 330 may be damaged or ignited, and thus there may be a risk of fire.

Figure 4:
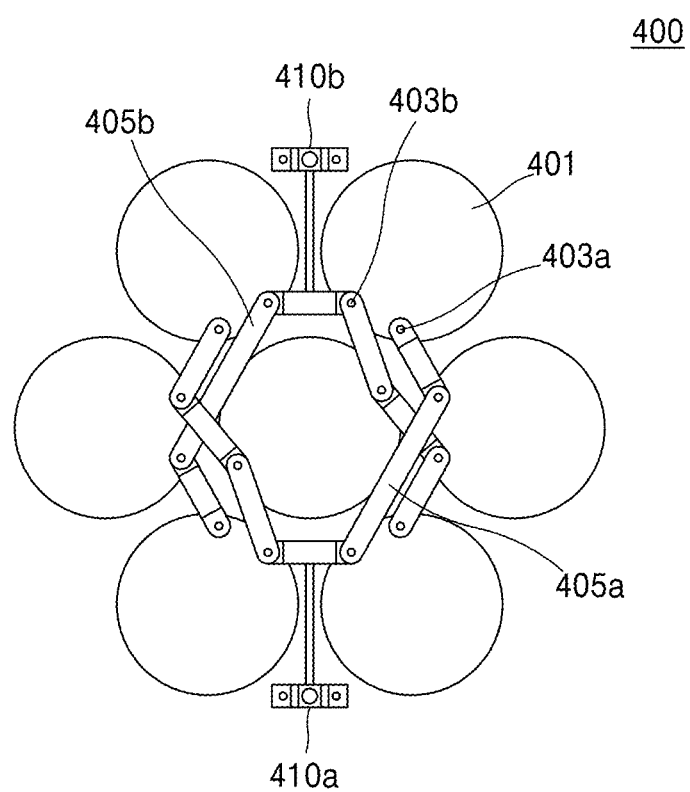
FIG. 4 is a diagram of an existing ignition circuit connecting ignition electrodes of thermal batteries configuring a thermal battery module.

FIG. 4 is a diagram of existing wires and switches, in which ignition electrodes of all thermal batteries 401 configuring a thermal battery module 400 are electrically connected by using a busbar.

Referring to FIG. 4, to reduce quantities of wires and switches, first ignition electrodes 403a of the thermal batteries 401 configuring the thermal battery module 400 are electrically connected by using a first busbar 405a, and second ignition electrodes 403b thereof are electrically connected by using a second busbar 405b.

The first busbar 405a accesses a first terminal 410a to receive an ignition signal from an external circuit and transmit the same to the first ignition electrodes 403a, and the second busbar 405b accesses a second terminal 410b to receive an ignition signal from the external circuit and transmit the same to the second ignition electrodes 403b.

Such a method reduces wiring by using the first and second busbars 405a and 405b, thereby reducing a weight and volume of a thermal battery system. However, it is unable to selectively activate the thermal batteries 401 configuring the thermal battery module 400, and thus it is not possible to control operations of individual ignition device due to external noise or the like that is not the ignition signal, thereby causing a safety issue of the entire thermal battery system.

Also, the ignition devices included in the thermal batteries 401 connected in parallel and configuring one thermal battery module 400 may have different individual resistances. Accordingly, even when a voltage and current conforming a standard are applied, there may be the thermal battery 401 that is not activated due to un-ignition of the ignition device. When the thermal battery 401 is not activated due to the un-ignition of the ignition device, not only an output characteristic of the thermal battery system does not satisfy a requirement of an apparatus, but also a risk of explosion may be induced.

Accordingly, a configuration of connecting, in series or in parallel, the first and second ignition electrodes 403a and 403b of the thermal batteries 401, using the first and second busbars 405a and 405b, which are unable to selectively activate the thermal batteries 401, may reduce reliability and safety of the entire thermal battery system.

Figure 5:
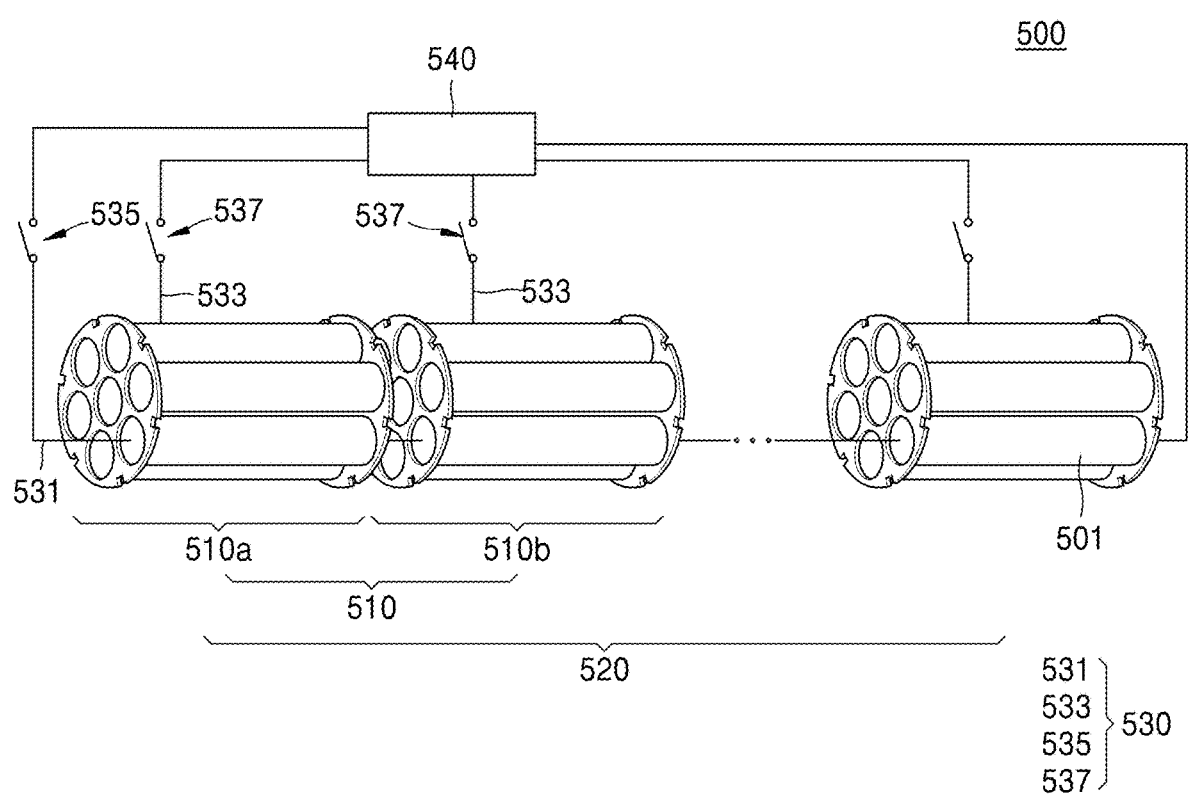
FIG. 5 is a diagram for describing a thermal battery system according to an embodiment of the disclosure.

FIG. 5 is a diagram for describing a thermal battery assembly 520 and ignition matrix device, according to an embodiment of the disclosure.

Referring to FIG. 5, a thermal battery system 500 includes the thermal battery assembly 520, an ignition circuit 530, and a control unit 540.

The thermal battery assembly 520 is formed as thermal battery modules 510 including a plurality of thermal batteries 501 connected in parallel are stacked in a direction parallel to an axis of the thermal batteries 501.

The ignition circuit 530 includes a plurality of first wires 531 connecting first ignition electrodes of the thermal batteries 501 arranged in series from among the plurality of thermal batteries 501, and a plurality of second wires 533 connecting second ignition electrodes of the thermal batteries 501 arranged in parallel from among the plurality of thermal batteries 501.

The first wires 531 electrically access a first terminal configured such that a first ignition voltage is applied, and are connected to a plurality of first switches 535 connecting the plurality of first wires 531 and the first terminal, according to control by the control unit 540.

The second wires 533 electrically access a second terminal configured such that a second ignition voltage is applied, and are connected to a plurality of second switches 537 connecting the plurality of second wires 533 and the second terminal, according to control by the control unit 540.

In other words, according to an embodiment, the thermal battery assembly 520 includes the plurality of thermal battery modules 510 connected in series when the plurality of thermal batteries 501 operate as an energy source, the plurality of thermal battery modules 510 includes the plurality of thermal batteries 501 connected in parallel when the plurality of thermal batteries 501 operate as an energy source, the thermal batteries 501 arranged in parallel may be arranged in the plurality of thermal battery modules 510, respectively, and the thermal batteries 501 arranged in series may be arranged at corresponding locations in the plurality of thermal battery modules 510.

When the thermal battery assembly 520 includes M thermal battery modules 510 and each of the M thermal battery modules 510 includes N thermal batteries 501, the numbers of first wires 531 and first switches 535 configuring the ignition circuit 530 are N, and the numbers of second wires 533 and second switches 537 configuring the same are M.

The control unit 540 may selectively ignite one of the plurality of thermal batteries 501 in an active matrix manner, by using the plurality of first switches 535 and plurality of second switches 537.

The control unit 540 may select one of the plurality of thermal batteries 501 and individually ignite the selected thermal battery 501, by turning on one of the plurality of first switches 535 and one of the plurality of second switches 537.

Figure 6:
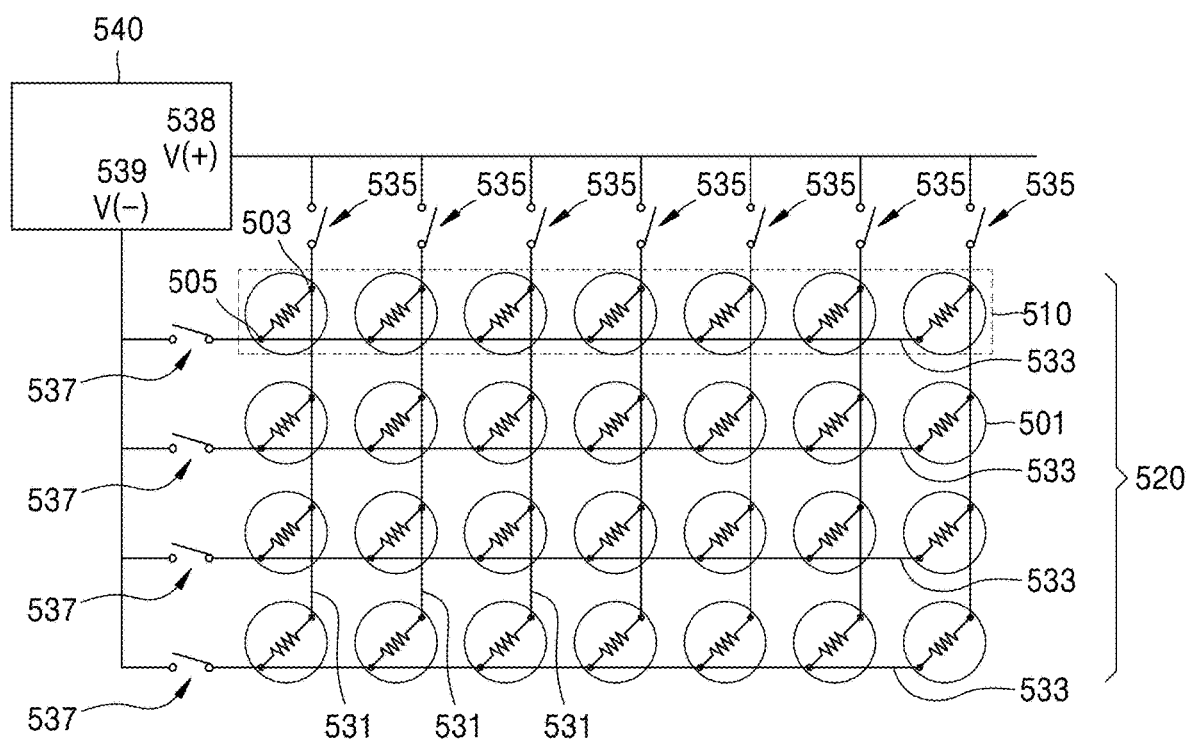
FIG. 6 is a diagram for describing operations of the thermal battery system of FIG. 5.

FIG. 6 is a diagram for describing operations of the thermal battery system 500 of FIG. 5.

Referring to FIG. 6, the thermal battery system 500 includes the thermal battery assembly 520, the ignition circuit 530, and the control unit 540.

The thermal batteries 501 configuring the thermal battery module 510 configure a row of a matrix, and the thermal batteries 501 arranged at corresponding locations as the thermal battery modules 510 are stacked configure a column of the matrix.

The ignition circuit 530 includes the first wires 531, the second wires 533, the first switches 535, and the second switches 537.

The first wires 531 connect first ignition electrodes 503 of the thermal batteries 501 arranged at corresponding locations, when the thermal battery modules 510 are stacked.

The second wires 533 connect second ignition electrodes 505 of the thermal batteries 501 configuring the thermal battery modules 510.

The first wires 531 are connected to a first terminal 538 applying a first ignition voltage. Also, the first wires 531 are connected to the first switches 535 connecting the first terminal 538 and the first wires 531, according to control by the control unit 540.

The second wires 533 are electrically connected to a second terminal 539 applying a second ignition voltage. Also, the second wires 533 are connected to the second switches 537 connecting the second terminal 539 and the second wires 533, according to control by the control unit 540.

When the thermal battery assembly 520 includes M thermal battery modules 510 and each of the M thermal battery modules 510 includes N thermal batteries 501, an ignition matrix may be indicated as an M×N matrix.

The control unit 540 may select one of the plurality of thermal batteries 501 and individually ignite the selected thermal battery 501 by applying an ignition voltage to the first ignition electrode 503 and second ignition electrode 505 of the selected thermal battery 501, by turning on an m-th first switch 535 and an n-th second switch 537.

TABLE 1

| Number of Batteries | Individual Activation Manner | | Matrix Activation Manner | |
|---|---|---|---|---|
| | Number of Switches | Number of Wires | Number of Switches | Number of Wires |
| 25 | 50 | 50 | 10 | 10 |
| 28 | 56 | 56 | 11 | 11 |
| 36 | 72 | 72 | 12 | 12 |
| 45 | 90 | 90 | 13 | 13 |
| 49 | 98 | 98 | 14 | 14 |

Table 1 is a table comparing the numbers of switches and wires between an existing individual activation manner shown in FIG. 3 and an ignition matrix activation manner according to an embodiment of the disclosure.

Referring to Table 1, it is verified that the numbers of switches and wires required by the thermal battery system 500 to which the ignition circuit 530 according to an embodiment of the disclosure is applied are noticeably reduced. In particular, differences in the required numbers of switches and wires are increased when the number of thermal batteries 501 configuring the thermal battery system 500 is increased.

Figure 7:
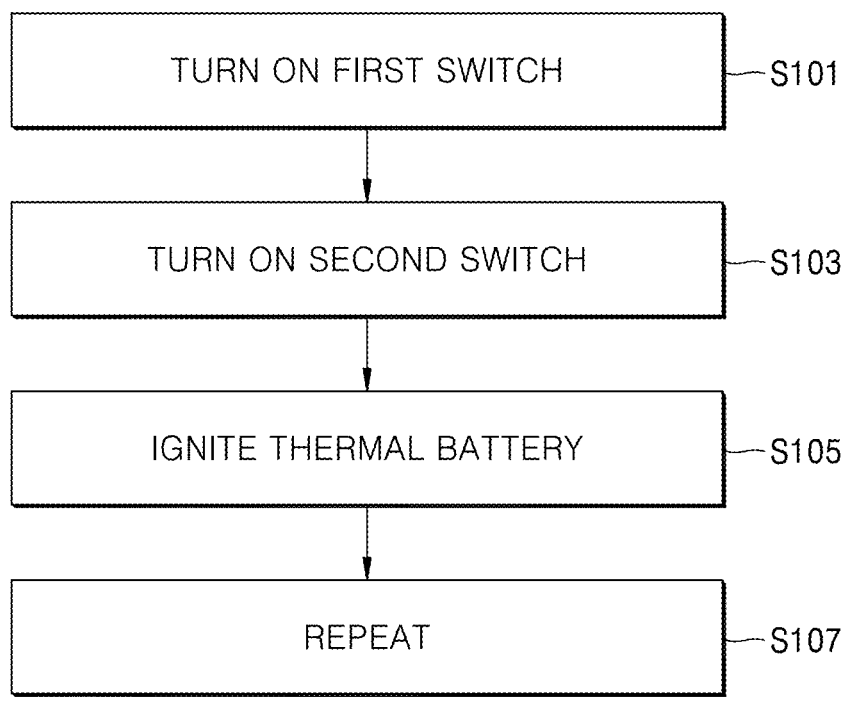
FIG. 7 is a flowchart of an ignition method of a thermal battery system, according to an embodiment of the disclosure.

FIG. 7 is a flowchart of an ignition method of a thermal battery system, according to an embodiment of the disclosure.

Referring to FIG. 7, the ignition method of the thermal battery system, according to an embodiment of the disclosure, includes turning on a first switch (operation S101), turning on a second switch (operation S103), igniting a thermal battery (operation S105), and repeating (operation S107).

First, in operation S101, a control unit selects one of a plurality of first wires connecting first ignition electrodes of thermal batteries, and turns on the first switch connecting the selected first wire to a first terminal.

In operation S103, the control unit selects one of a plurality of second wires connecting second ignition electrodes of the thermal batteries, and turns on the second switch connecting the selected second wire to a second terminal.

Operations S101 and S103 may be performed sequentially, in a reverse order, or simultaneously, according to an algorithm of the control unit.

In operation S105, a first ignition voltage and a second ignition voltage are respectively applied to a first ignition electrodes and a second ignition electrodes of the thermal battery. An ignition device provided inside the thermal battery performs a function as the ignition device as an initiator explodes by an ignition signal and a main agent is combusted by the initiator. Here, a duration for applying the first and second ignition voltages may be about 10 msec.

In operation S107, the control unit may repeat operations S101, S103, and S105. In operation S107, the first switch or second switch that is unnecessarily turned on may be turned off. In operation S107, the control unit may repeat operations S101, S103, and S105 at pre-set time intervals such that the thermal batteries are sequentially ignited at the pre-set time intervals, in consideration of an application time of an ignition voltage required to ignite the thermal batteries.

Here, the pre-set time intervals may be about 10 msec.

The control unit may omit some operations or add an operation for repetition, according to a thermal battery ignition algorithm. For example, the control unit may sequentially activate all thermal batteries connected to an n-th first wire by turning on an n-th first switch and then repeatedly turning on a first second switch to an M-th second switch. However, this is only an embodiment and the disclosure is not limited thereto.

The disclosure is applicable to a thermal battery system including several or tens of thermal batteries connected in series or in parallel. Accordingly, by configuring a system in which a plurality of thermal batteries having a low output compared to a lithium secondary battery or the like are connected to each other, the thermal battery system may be applied to various devices requiring a high output.

In this case, a weight and volume of the thermal battery system may be reduced by reducing an ignition circuit for activation of the thermal batteries, thereby reducing high manufacture costs and installation costs caused by the complicated ignition circuit. Also, damage to the ignition circuit, caused by ignition of the thermal batteries, may be reduced.

In addition, when the plurality of thermal batteries are simultaneously ignited by selectively igniting the thermal batteries configuring the thermal battery system, issues, such as inability to control an operation of an ignition device due to noise or the like, dissatisfaction of an output characteristic of the thermal battery system with requirements due to inactivation of some thermal batteries, and an explosion of the thermal battery in a severe case, may be prevented.

Technical effects the disclosure are not limited to those mentioned above, and other technical effects that are not mentioned may be clearly understood by one of ordinary skill in the art from the description above.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A thermal battery system comprising:
a thermal battery assembly including a plurality of thermal battery modules each comprising a plurality of thermal batteries;
an ignition circuit connected to the plurality of thermal batteries in the thermal battery assembly; and
a control unit configured to control the ignition circuit to ignite a selected thermal battery in the thermal battery assembly,
wherein the ignition circuit comprises:
a first terminal configured to apply a first ignition voltage;
a second terminal configured to apply a second ignition voltage;
a plurality of first wires and a plurality of second wires; and
a plurality of first switches and a plurality of second switches, and
wherein each of the plurality of first wires connects to each of first ignition electrodes of the thermal batteries arranged in each of the plurality of thermal battery modules, and each of the plurality of second wires connects to each of second ignition electrodes of the thermal batteries arranged in each of the plurality of thermal battery modules, and
each of the plurality of first switches connects the first terminal to a corresponding one of the plurality of first wires, and each of the plurality of second switches connects the second terminal to a corresponding one of the plurality of second wires, and
the control unit is configured to turn on one of the plurality of first switches and one of the plurality of second switches and ignites a thermal battery in which a first ignition electrode is connected to a first wire corresponding to the turned-on first switch and a second ignition electrode is connected to a second wire corresponding to the turned-on second switch.

2. The thermal battery system of claim 1, wherein
the thermal battery assembly comprises the plurality of thermal battery modules connected in series when the plurality of thermal batteries operate as an energy source,
each of the plurality of thermal battery modules comprises the plurality of thermal batteries connected in parallel when the plurality of thermal batteries operate as an energy source,
the thermal batteries arranged in parallel are arranged at the plurality of thermal battery modules, respectively, and
the thermal batteries arranged in series are arranged at corresponding locations in the plurality of thermal battery modules.

3. The thermal battery system of claim 2, wherein
the thermal battery assembly comprises M thermal battery modules,
each of the M thermal battery modules comprises N thermal batteries,
a number of the plurality of first switches is N, and
a number of the plurality of second switches is M.

4. The thermal battery system of claim 1, wherein
the control unit is configured to select one of the plurality of thermal batteries by turning on one of the plurality of first switches and one of the plurality of second switches, and
individually ignite the selected thermal battery.

5. The thermal battery system of claim 1, wherein
the control unit is configured to sequentially ignite the plurality of thermal batteries at pre-set time intervals.

6. The thermal battery system of claim 5, wherein
the pre-set time intervals are 10 ms.

7. An ignition method for a thermal battery system comprising
a thermal battery assembly including battery modules each comprising a plurality of thermal batteries, an ignition circuit connected to the plurality of thermal batteries in the thermal battery assembly, and a control unit configured to control the ignition circuit to ignite a selected thermal battery in the thermal battery assembly, the ignition method comprising:
selecting, by the control unit, one of a plurality of first wires connecting to one of first ignition electrodes of thermal batteries arranged in each battery module, and turning on a first switch for connecting the selected first wire to a first terminal;
selecting, by the control unit, one of a plurality of second wires connecting to one of second ignition electrodes of thermal batteries arranged in one of the battery modules, and turning on a second switch for connecting the selected second wire to a second terminal;
igniting, by the control unit, a thermal battery in which a first electrode is connected to the selected first wire and a second electrode is connected to the selected second wire; and
repeating, by the control unit, the turning on of the first switch, the turning on of the second switch, and the igniting of the thermal battery.

8. The ignition method of claim 7, wherein
the repeating comprises
sequentially igniting, by the control unit, the plurality of thermal batteries at pre-set time intervals.

9. The ignition method of claim 8, wherein the pre-set time intervals are 10 ms.

* * * * *